May 9, 1967 S. B. BERGER ETAL 3,318,652
OPTICAL DEVICES UTILIZING FARADAY ROTATION
Filed April 23, 1963 2 Sheets-Sheet 1
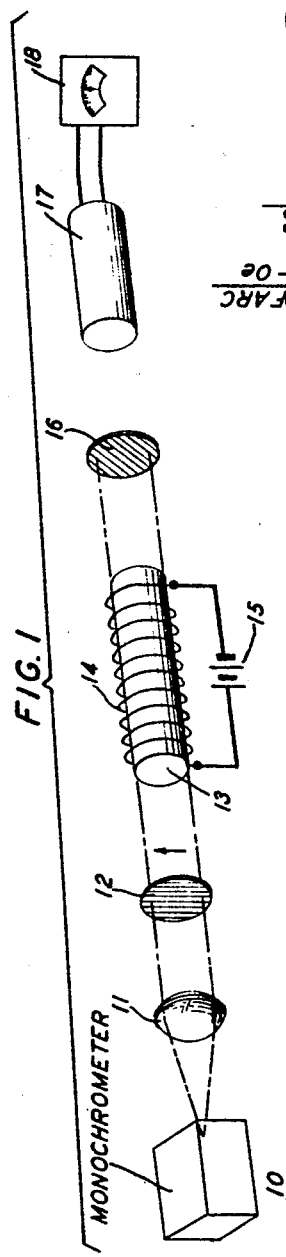
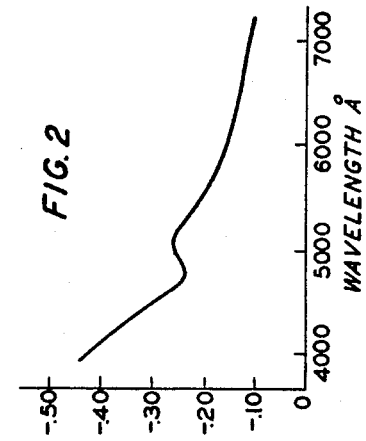
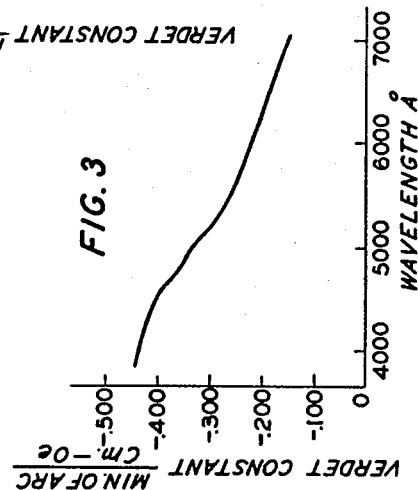
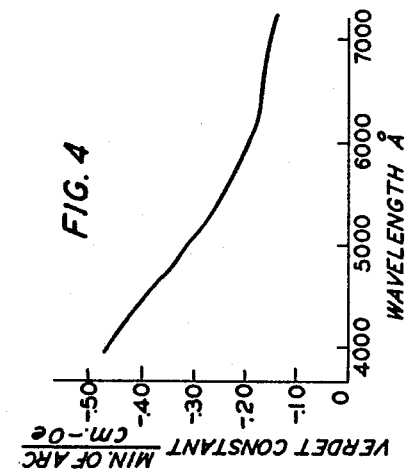
INVENTORS S. B. BERGER
C. B. RUBINSTEIN
BY
ATTORNEY

United States Patent Office 3,318,652
Patented May 9, 1967

3,318,652
OPTICAL DEVICES UTILIZING FARADAY ROTATION
Stuart B. Berger, Springfield, and Charles B. Rubinstein, Summit, N.J., assignors to Bell Telephone Laboratories, Incorporated, New York, N.Y., a corporation of New York
Filed Apr. 23, 1963, Ser. No. 274,999
8 Claims. (Cl. 350—151)

This invention relates to optical devices utilizing the Faraday rotation effect. More specifically it concerns glass rotating materials which provide useful and unexpected optical properties.

Attending the recent interest in the generation of coherent light radiation by optical or light-frequency masers, commonly termed lasers, is an intense interest in various optical devices which are necessarily for the practical utilization of this new form of radiation. These devices are analogous in function to corresponding RF or microwave elements of the prior art.

A principal effect according to which many of these optical devices operate is the Faraday rotation effect. This is based upon the principle that when electromagnetic radiation is passed through a longitudinally magnetized body of an appropriate material, any given plane of polarization is rotated as a linear function of transmission distance. The degree of rotation is also related to the magnetic field imposed on the material. Rotation devices based upon this principle are known in the art and an effective rotating medium and an exemplary rotational device are described and claimed in U.S. Patent No. 2,974,568, issued March 14, 1961. This discussion and this invention are directed to light frequency devices including those operating at infra-red and ultra-violet wavelengths. The optical or light spectrum is generally considered to extend from 100 to $10^6$ angstroms.

While the prior art devices are effective, the search is continuing for new and better rotating materials. Many considerations are important in selecting the rotating medium. Among these are the Verdet constant which defines the length of the transmission path for a given magnetic field required to achieve the desired function, the ease and expense of obtaining the rotating material, the chemical and physical stability of the material and its optical absorption in the band of interest. To a large extent the latter factor defines the loss characteristics of a rotating device incorporating that material.

This invention is directed to a class of rotating materials which, according to the foregoing considerations, among others, provide extremely useful and unexpected light rotating characteristics.

The light rotating materials according to the invention are glasses incorporating one or more of the trivalent ions of terbium, dysprosium and praseodymium. These ions are paramagnetic and under the influence of an appropriate magnetic field are extremely effective light rotators. The glass host lattice provides a highly transparent medium and can be made in large bodies without regard to the difficult problems associated with growing the crystal materials of the prior art. The glass systems including these ions, and within the scope of this invention, are extremely stable and are easily handled and fabricated into device elements.

The rotation of various glass systems incorporating these rare earth ions will be considered here in terms of the Verdet constant which is related to the parameters of interest by:

$$\theta = VlH$$

where $\theta$ is the angle of rotation in minutes of arc, V is the Verdet constant, $l$ is the length of transmission in centimeters and H is the magnetic field in oersteds. This proportional relationship is valid except at extremely low temperatures where saturation effects are encountered whereupon the rotation becomes proportional to a Brillouin function, which under certain conditions reduces to $$\theta = A \tanh \frac{\mu H}{KT}$$

where $\mu$ is the magnetic moment, K is Boltzmann's constant, T the temperature in degrees Kelvin and A is the saturation rotation at the frequency of interest. The Verdet constant, V, in the visible (neglecting intra-f. orbital transitions) for the trivalent ions under discussion is obtained from:

$$V \sim v_i^2 \Sigma_{n'} \left[ \frac{A_1(n')}{(v_n'^2 - v_i^2)^2} + \frac{A_2(n')}{T(v_n'^2 - v_i^2)} + \frac{A_3(n')}{(v_n'^2 - v_i^2)} \right]$$

where
$V_1$=frequency of incident light,
$v_n'$=absorption frequency of glass sample, and
$A_1$, $A_2$, and $A_3$ are constants for the material and are related to the various absorptions.

For a further explanation of these and other aspects of the Verdet constant and its significance see "Theory of Electric and Magnetic Susceptibilities," J. H. Vleck, Oxford University Press, (1932).

The particular optical properties of the materials used in the devices of this invention and a brief consideration of the devices themselves will perhaps be more readily appreciated when considered in conjunction with the drawing in which:

FIG. 1 is a schematic representation of an apparatus used to measure the light rotating properties of rotating elements constructed according to this invention;

FIG. 2 is a plot of the Verdet constant vs. wavelength for the ion praseodymium in a typical glass composition according to the invention;

FIG. 3 is a similar plot for terbium;

FIG. 4 is a similar plot for dysprosium;

Figure 5:
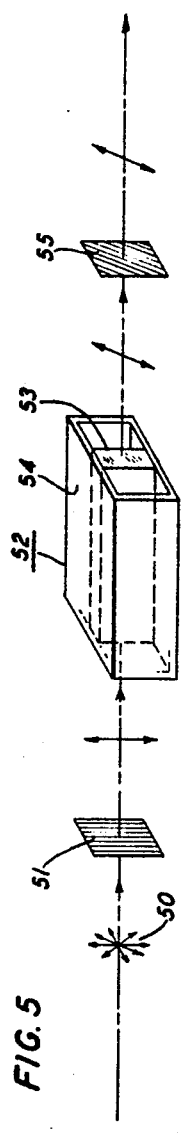
FIG. 5 is a schematic representation of the operation of an optical modulator according to the invention.

Various glass samples were made up containing praseodymium, terbium and dysprosium.

The general procedure for their preparation is described as follows:

The rare earth ion was added as the oxide although the carbonate may be used as well. For the phosphate glass systems the glass forming phosphate was added as dibasic ammonium phosphate to provide a somewhat reducing atmosphere. Phosphorus oxide was found less suitable since it readily vaporizes and thus is lost to the reaction. It also corrodes the container. Other materials appropriate in this regard are monobasic ammonium phosphate, and ammonium metaphosphate.

The provision of a reducing atmosphere is also desirable in making glasses in the borate systems and ammonium borate is a useful reactant. However, since the problem is less severe, boric anhydride has been used successfully. Boric acid is also appropriate. In the germanium containing system the simple oxide may be used.

The reactants are finely powdered and thoroughly mixed. The mixture is then preferably calcined at a temperature just below the solidus temperature of the mixture and for a period of approximately one-half hour. The container for this operation may be any refractory material which can withstand the temperature without reaction. Platinum is particularly effective.

After calcining, the mixture is again ground and thoroughly mixed. The mixture is then fired until molten. The melting operation may be carried out in air or alternatively, an inert atmosphere such as nitrogen or argon may be used as a precaution against oxidation. The mixture is then cooled rapidly to prevent devitrification. This is conveniently achieved by pouring the melt into a mold constructed from a thermally conductive material such as brass. Since the initial cooling in the crucible occurs quite quickly, the operation is quite successful if the melt is cooled in situ to a temperature of approximately 1100° C. and then quenched in the mold.

When the sample has cooled it is annealed at approximately 550° C. for approximately one-half hour and then cooled at less than 3° C. per minute.

Various specific compositions were made up according to the following prescribed procedures:

Example I

A mixture of 30 mol percent $Tb_2O_3$ and 70 mol percent $(NH_4)_2HPO_4$ was thoroughly ground and mixed. The mixture, contained in a platinum crucible, was calcined at 900° C. for one-half hour. The mixture was ground and mixed again and fired in air at 1600° C. for one-half hour.

The melt was cooled to 1000° C. and poured into a brass form. The form consisted of heavy brass blocks placed so as to provide a rectangular mold. The cooled sample was annealed at 500° C. for one-half hour and cooled at a rate of 2° C. per minute. The resulting glass was optically clear.

Example II

A mixture of 30 mol percent $Tb_2O_3$:70 mol percent $B_2O_3$ was ground and mixed and calcined as in Example I. The mixture was reground and then fired in air for one-half hour at 1400° C. The sample was cooled and annealed according to the procedure of Example I. Again the resulting glass was optically transparent.

Example III

A terbium-germanium glass was made according to the procedure of Example I. The reactants were 25 mol percent $Tb_2O_3$ and 75 mol percent $GeO_2$. The procedure varied only in that the mixture was fired at approximately 2000° C. The glass was stable and clear.

Example IV

In this example a glass was made containing praseodymium. The reactants were 30 mol percent $Pr_2O_3$:70 mol percent $B_2O_3$. Again the same general procedure was followed. This mixture was fired at 1500° C. The resulting glass was transparent.

Example V

Another praseodymium glass was made by melting $30Pr_2O_3$:$70P_2O_5$ according to the procedure of the preceding examples. The firing temperature was 1650° C. The glass sample was optically clear.

Example VI

A mixture of $25Pr_2O_3$:$75GeO_2$ was calcined and melted as before at approximately 2200° C. The glass obtained was transparent.

Example VII

In this example aluminum oxide was added to the mixture. This has the effect of reducing the melting point and increasing the solubility of the rare earth ion. The reactants were $35Tb_2O_3$:$65(B_2O_3+Al_2O_3)$. The firing temperature was 1350° C. The glass forming procedure was otherwise identical to that described in Example I.

Example VIII

A further increase in the amount of rare earth ion was found to obtain from the use of mixed glass systems. According to the foregoing procedure a mixture of
$60Pr_2O_3$:$40(GeO_2+B_2O_3)$
produced a stable and optically clear glass. This mixture was fired at approximately 1500° C.

Example IX

Another mixed glass was similarly prepared using $50Tb_2O_3$:$50(GeO_2+B_2O_3)$. This mixture was fired at 1400° C. and produced a stable, clear glass.

Example X

A mixed glass similar to that of Example IX was prepared using equal mol percents of $GeO_2$, $Al_2O_3$ and $B_2O_3$. A stable clear glass phase formed after firing at 1400° C., cooling and annealing according to the same general procedure.

Example XI

A dysprosium-containing glass was formed by mixing 25 mol percent $Dy_2(CO_3)_3 \cdot 4H_2O$ and 75 mol percent $(NH_4)_2HPO_4$ and calcining as in Example I. The mixture was then fired in air for two hours at 1440° C. The glass after annealing as in Example I was found to be stable and clear.

Example XII

A dysprosium glass was prepared with 25 mol percent $Dy_2(CO_3)_3 \cdot 4H_2O$ and 75 mol percent $B_2O_3$ according to the technique of the preceding examples. The mixture was fired at approximately 1400° C. The resulting glass is transparent.

Example XIII

Another dysprosium glass was made using 25 mol percent $Dy_2(CO_3)_3 \cdot 4H_2O$ and 75 mol percent $GeO_2$. This mixture was fired at about 2000° C. and forms a clear, stable glass.

The foregoing examples illustrate appropriate procedures for obtaining the prescribed typical compositions. As was previously noted, the light rotating property of these materials is attributable to the presence of the rare earth ion and has been found to be a first order function of the concentration of rare earth ion in the glass matrix. Accordingly, the most useful glasses appear to be those with the highest rare earth ion concentration. However, the stability of the glass begins to diminish as higher rare earth in concentrations are reached. It was generally found that up to 35 mol percent of rare earth ion was obtainable in the glass systems described except that the mixed glasses permitted amounts up to at least 60 mol percent rare earth ion. Beyond these limits the melt tends to devitrify on cooling and a crystal phase appears. However, more elegant melting techniques and future advances in glass forming procedures should permit greater rare earth ion inclusions in certain, if not all, of the systems described here. Accordingly, for the purposes of this invention a minimum useful limit of at least 0.2 ion per mol of rare earth ion is imposed. This corresponds to the formula:

$.1R_2O_3$:$.9$ (glass forming oxide)

The preferred composition includes at least 40 mol percent of the rare earth ion. The maximum concentration is limited only by the capabilities of the art.

Each of the glass samples prepared in the foregoing examples was optically transparent. Typical absorption losses for these materials are 0.03 to 0.08 db/cm. at 7000 angstroms.

The light rotating properties of various glass samples were measured in terms of their Verdet constants. The data was obtained with the aid of the apparatus shown in FIG. 1. In FIG. 1 element 10 represents a monochrometer which is of known construction and serves to generate a point source of monochromatic light. The bandwidth of the monochrometer was less than 60 angstroms. The light frequency was chosen at 7000 angstroms for the reason that this wavelength corresponds approximately to the principal ruby laser line and the resulting measurements indicate the properties of the various glasses when used in a ruby laser system. This is given as exemplary, and effective rotation at other frequencies permits the application of this invention to systems operating over a broad region of the light spectrum, including infra-red and ultra-violet radiation. The output radiation from the monochrometer was beamed through a collimator lens 11 to obtain an essentially parallel beam and was then transmitted through a first prism 12 known to the art as a Glan-Thompson prism which polarizes the light into the plane indicated by the arrow. The radiation then enters the rotating element 13 which is a rod of the rare-earth-containing glass sample. The rotator 13 is maintained in a magnetic field generated by coil 14 and power source indicated at 15 and which, for these investigations, had a field value of 7250 oersteds in the direction of propagation of the radiation. The radiation emanating from the sample is then analyzed for another Glan-Thompson prism 16 to detect the amount of rotation attributable to the given length of glass rod and the incident field. The detection was made by a multiplier phototube 17 and differential voltmeter 18. The readings were made by rotating the prism 16 to give minimum intensity and measuring the angle of rotation of the prism.

The Verdet constants for the compositions of Examples I to XII are tabulated in the following table.

TABLE I

| Composition: | Verdet constant at 7000 A. and 22° C. |
|---|---|
| $.3Tb_2O_3 \cdot .7P_2O_5$ | −.18 |
| $.3Tb_2O_3 \cdot .7B_2O_3$ | −.25 |
| $.25Tb_2O_3 \cdot .75GeO_2$ | −.23 |
| $.3Pr_2O_3 \cdot .7P_2O_5$ | −.15 |
| $.3Pr_2O_3 \cdot .7B_2O_3$ | −.16 |
| $.3Pr_2O_3 \cdot .7GeO_2$ | −.19 |
| $.3Dy_2O_3 \cdot .7P_2O_5$ | −.17 |
| $.3Dy_2O_3 \cdot .7B_2O_3$ | −.22 |
| $.3Dy_2O_3 \cdot .7GeO_2$ | −.20 |
| $.35Tb_2O_3 \cdot .65(B_2O_3+Al_2O_3)$ | −.27 |
| $.35Tb_2O_3 \cdot .65(P_2O_5+Al_2O_3)$ | −.22 |
| $.6Pr_2O_3 \cdot .4(GeO_2+B_2O_3)$ | −.37 |
| $.5Tb_2O_3 \cdot .5(GeO_2+B_2O_3)$ | −.37 |
| $.5Tb_2O_3 \cdot .5(GeO_2+B_2O_3+Al_2O_3)$ | −.37 |

All mixtures in parentheses include equal parts of each oxide. The negative sign on the Verdet constant indicates the direction of rotation according to standard convention. These measurements were made at room temperature. The Verdet constants increase substantially as the temperature is reduced.

It has been found that the Verdet constants in a given system vary essentially linearly with the rare earth ion density. Thus, for a given composition different from those tabulated, the Verdet constant can be obtained from the relation:

$$v = \frac{v_1 d}{d_1}$$

where $v$ is the Verdet constant of the new composition and $v_1$ is the corresponding known value otherwise obtained as from Table I. The ion densities $d$ and $d_1$ can be calculated from:

$$d = \frac{DN_0}{F}$$

where $d$ is the ion density in ions/cm.$^3$, D is the density in gms./cm.$^3$, $N_0$ is Avogadros number $= 6.0228 \times 10^{23}$ ions formula weight, and F is the formula weight in grams per mol per rare earth ion.

The Verdet constants at room temperature for the three ions of interest are plotted as a function of wavelength in FIGS. 2 to 4. FIG. 2 is directed to praseodymium and FIGS. 3 and 4 to terbium and dysprosium, respectively. The composition of the samples used to obtain these measurements was the same, in each case being approximately 25 mol percent rare earth oxide, 75 mol percent $P_2O_5$. The rotation is found to increase for higher frequencies suggesting even more effective devices for smaller wavelength systems such as systems operating in the green band currently being sought for transmission through water.

Glasses containing mixtures of these rare earth ions have been successfully prepared and exhibit a rotation capability equal to the sum of the calculated rotations attributable to each ion. For instance the Verdet constant for a glass having the composition: 18 mol percent $Pr_2O_3$:18 mol percent $Tb_2O_3$:$64B_2O_3$ was measured and found to be −0.25.

From considerations of the glass forming properties of these glass compositions, several additions and substitutions of fillers and modifiers will be apparent to those skilled in the art. Glass systems other than those given as exemplary and which contain large amounts of the rare earth ions terbium, prasedoymium and dysprosium will also be effective. Devices incorporating glass materials having compositions based on such modifications and variations are considered to be within the scope of this invention as long as the required rare earth ion is present in suitable amounts and the essential basis for the operation of the device is the rotation attributable to the rare earth ion.

Those skilled in the art will appreciate that the Verdet constants appearing in Table I are unexpectedly high. This suggests that these materials are exceptionally well suited for use as rotation elements in optical devices which depend for their operation on the Faraday rotation effect.

Various of these devices are presently known in the art. As previously indicated these include isolators, modulators, gyrators, circulators, etc.

FIG. 5 shows a typical modulator construction adapted to utilize a rotating element comprising one or more of the foregoing glass materials. The input radiation is shown symbolically as an unpolarized beam 50 which is polarized by prism 51 which may be a Glan-Thompson or Nicol prism or similar polarizing medium. The plane polarized beam is then transmitted through the rotating element 52. This element comprises a glass rod 53 having a composition according to this invention mounted in a rectangular wave guide 54. The waveguide is of known construction. An electromagnetic signal introduced into the waveguide possesses magnetic fields which couple with the magnetic rare earth ions in the glass producing the familiar rotation effect. The output radiation from the rotating element is then analyzed with the aid of prism 55 which is rotated 45° with respect to prism 51. With no signal in the waveguide the polarization plane resulting from prism 51 remains unchanged and one half the radiation will pass prism 55. When the signal reaches the requisite strength, the plane of polarization will be rotated by the rotating element 52 through an arc corresponding with the allowed plane of prism 55 and all the radiation will be transmitted. By modulating the signal the detector 55 passes a modulated beam of varying light intensity. Alternatively, the light beam may be phase modulated by using a beam divider preceding the waveguide, modulating one portion of the beam and using the multiplier phototube to detect the beats with respect to the unmodulated beam.

Figure 6A:
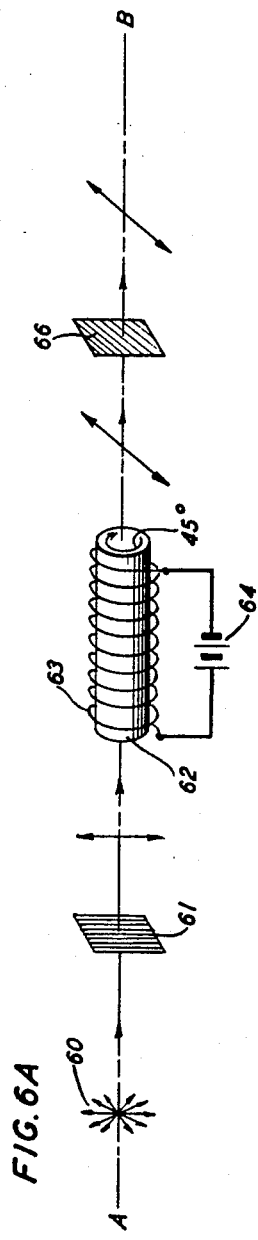
FIG. 6A and FIG. 6B are schematic representations of the operation of an optical isolator.
Figure 6B:
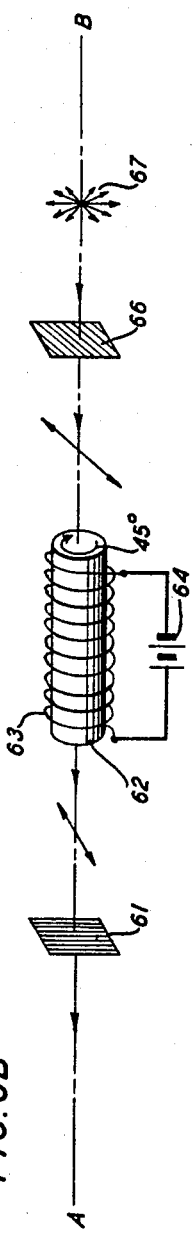

FIG. 6 illustrates an isolator constructed according to the same principles. FIG. 6a depicts the case in which light is transmitted from A to B while FIG. 6b represents the converse. Again the input radiation is represented by the symbol 60 which is plane polarized by prism 61 and rotated by the glass rotating element 62. The rotating element has a solenoid or permanent magnet associated with it. The solenoid as shown includes coil 63 and power source 64. The field strength of the coil is adjusted by the power source in relation to the length of the rotating element 62 to achieve a rotation angle of 45° as indicated. The analyzing prism 66 is adjusted to pass a rotated 45° beam. Referring now to FIG. 6b the unpolarized radiation 67 originates at B and is polarized at a 45° angle by polarizer 66. The rotator 62 rotates the plane of polarization another 45° under the same operating conditions as prevailed in FIG. 6a. However, the radiation is now polarized 90° with respect to the allowed transmission plane of prism 61 and no light passes from B to A.

Various other optical devices can be constructed according to the principles related here and those existing in the art. All such devices which basically utilize the teachings through which this invention has advanced the art are considered within the spirit and scope of this invention.

What is claimed is:

1. A light rotating device comprising in combination a light rotating medium consisting essentially of a glass having the composition represented by the formula:

$$xR_2O_3 \cdot (1-x)A$$

where $x$ has a value of at least 0.1, R is a rare earth ion selected from the group consisting of praseodymium, terbium, dysprosium and mixtures thereof, and A is selected from the group consisting of $P_2O_5$, $B_2O_3$, $GeO_2$ and mixtures thereof, a source of polarized light for directing polarized light through said medium, means for analyzing the light transmitted from the said medium, magnetic means for impressing a magnetic field on said medium said field having a component in the direction of propagation of the light through said medium.

2. The device of claim 1 wherein the light rotating medium has a composition in which $x$ has a value of .2 to .35.

3. The device of claim 1 wherein the light rotating medium has a composition in which A represents a mixture including two or more of the members $P_2O_5$, $B_2O_3$ and $GeO_2$.

4. The device of claim 3 wherein the light rotating medium has a composition in which $x$ has a value of the order of 0.5.

5. The device of claim 1 wherein the light rotating medium has a composition further including $Al_2O_3$.

6. An optical device comprising, in combination, a light rotating medium consisting essentially of a glass having the composition represented by the formula:

$$xR_2O_3 \cdot (1-x)P_2O_5$$

where R is selected from the group consisting of praseodymium, terbium, dysprosium and mixtures thereof, and $x$ has a value of at least 0.1, a source of polarized light for directing polarized light through said medium, means for analyzing the light transmitted from the said medium, magnetic means for impressing a magnetic field on said medium, said field having a component in the direction of propagation of the light through said medium.

7. An optical device comprising, in combination, a light rotating medium consisting essentially of a glass having the composition represented by the formula:

$$xR_2O_3 \cdot (1-x)B_2O_3$$

where R is selected from the group consisting of praseodymium, terbium, dysprosium and mixtures thereof, and $x$ has a value of at least 0.1, a source of polarized light for directing polarized light through said medium, means for analyzing the light transmitted from the said medium, magnetic means for impressing a magnetic field on said medium, said field having a component in the direction of propagation of the light through said medium.

8. An optical device comprising, in combination, a light rotating medium consisting essentially of a glass having the composition represented by the formula:

$$xR_2O_3 \cdot (1-x)GeO_2$$

where R is selected from the group consisting of praseodymium, terbium, dysprosium and mixtures thereof, and $x$ has a value of at least 0.1, a source of polarized light for directing a polarized light through said medium, means for analyzing the light transmitted from the said medium, magnetic means for impressing a magnetic field on said medium, said field having a component in the direction of propagation of the light through said medium.

References Cited by the Examiner

UNITED STATES PATENTS

| | | | |
|---|---|---|---|
| 2,109,540 | 3/1938 | Leishman | 88—61 X |
| 2,691,599 | 10/1954 | Blau | 106—47 |
| 3,239,670 | 3/1966 | Bloembergen | 250—199 |

JEWELL H. PEDERSEN, *Primary Examiner.*

DAVID H. RUBIN, *Examiner.*

E. S. BAUER, *Assistant Examiner.*